United States Patent
McNeely

(10) Patent No.: US 7,899,087 B2
(45) Date of Patent: Mar. 1, 2011

(54) APPARATUS AND METHOD FOR FREQUENCY TRANSLATION

(75) Inventor: David Lowell McNeely, Indianapolis, IN (US)

(73) Assignee: Thomson Licensing, Issy les Moulineaux (FR)

( * ) Notice: Subject to any disclaimer, the term of this patent is extended or adjusted under 35 U.S.C. 154(b) by 503 days.

(21) Appl. No.: 11/919,379

(22) PCT Filed: May 4, 2006

(86) PCT No.: PCT/US2006/017354

§ 371 (c)(1),
(2), (4) Date: Oct. 25, 2007

(87) PCT Pub. No.: WO2006/119490

PCT Pub. Date: Nov. 9, 2006

(65) Prior Publication Data

US 2009/0290602 A1     Nov. 26, 2009

Related U.S. Application Data

(60) Provisional application No. 60/677,563, filed on May 4, 2005.

(51) Int. Cl.
*H04J 3/04* (2006.01)

(52) U.S. Cl. ........................................ 370/535; 370/464

(58) Field of Classification Search ................. 370/316, 370/465, 466, 471, 533, 534, 535, 536; 375/316, 375/138, 139, 200, 260, 208, 344, 202
See application file for complete search history.

(56) References Cited

U.S. PATENT DOCUMENTS

| | | | | |
|---|---|---|---|---|
| 5,323,391 A * | 6/1994 | Harrison | ....................... | 370/210 |
| 5,535,240 A * | 7/1996 | Carney et al. | ............... | 375/219 |
| 5,835,497 A * | 11/1998 | Litzenberger et al. | ........ | 370/522 |
| 5,924,031 A * | 7/1999 | Copeland et al. | ............ | 455/428 |
| 7,006,805 B1 * | 2/2006 | Sorrells et al. | ........... | 455/188.1 |
| 7,054,281 B2 * | 5/2006 | McNeely | ..................... | 370/316 |

OTHER PUBLICATIONS

Search Report Dated Dec. 11, 2006.

* cited by examiner

*Primary Examiner*—Brenda Pham
(74) *Attorney, Agent, or Firm*—Robert D. Shedd; Vincent E. Duffy; Michael A. Pugel

(57) ABSTRACT

The disclosed embodiments relate to an apparatus and method for performing frequency translation. The apparatus includes a receiver for receiving and digitizing a plurality of first signals, each signal containing channels and for simultaneously recovering a set of selected channels from the plurality of first signals. The apparatus also includes a transmitter for combining the set of selected channels to produce a second signal. The method of the present invention includes receiving a first signal containing a plurality of different channels, selecting a set of selected channels from the plurality of different channels, combining the set of selected channels to form a second signal and transmitting the second signal.

22 Claims, 6 Drawing Sheets

APPARATUS AND METHOD FOR FREQUENCY TRANSLATION

This application claims the benefit under 35 U.S.C. §365 of International Application PCT/US2005/045438, filed Dec. 16, 2005, which was published in accordance with PCT article 21(2) on Oct. 26, 2006 in English.

FIELD OF THE INVENTION

The present invention generally relates to communications systems. More specifically, the present invention relates to the receiving and retransmission of content within a communications system.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

In today's data communication systems such as used in satellite TV, data of different types often reside in what are known as virtual channels. The data from these virtual channels is separately disassembled into data packets, aggregated within and across different data types into bit streams and conveyed by packet delivery systems. Data consumer appliances, such as satellite receivers, select from physical channels available to them, convert the signals on these channels to digital form (packets) and collect the data packets required to re-assemble the desired virtual channels of information (e.g., audio, video, program guide, transactional data, etc.). At different points along the data path between a content provider and a content consumer data management opportunities occur. A piece of data may come from one of many sources, be routed through one of many satellites, pass through several of many transponders aboard the satellite, be received by a consumer antenna, and be distributed to places of consumption.

Consumer receivers are often capable of receiving only one of the physical channels from the satellite at a time for display. However, new receivers may contain advanced features the consumer can use. For instance, a receiving device may contain more than one tuner for use in either two picture simultaneous display systems or content recording. Additionally, consumer households often include multiple receivers, each receiver requiring the tuning of one or more channels for use.

The ever-expanding amount of content for delivery has made it very difficult to deliver that content to all places at all times. Systems receiving data from up to four separate satellites to deliver programming to the home can no longer deliver all of the content on one coaxial cable connection. Various approaches have been adapted including the use of multiple cables or complex switching arrangements. Many of these approaches are in some manner suboptimal for a home installation due to high cost or high complexity.

Another solution may be to employ a system of preselecting, combining, and redistributing the incoming content based on the physical channels requested by the user(s) using analog signal processing. As a result, only the channels required for delivery to the receivers in a household are selected from the initial available content. The desired channels may then be provided on a single cable that is relatively easy to distribute around the household. The solution relies on coarse analog signal tuning and re-mixing to move channels or frequency regions of signals from an original spectral location in frequency at the input to another spectral location in frequency on a common signal at the output. Further, channels or signal regions at the same frequency but on different satellites may be combined by moving one or both of the original channels or regions. These relocated signals containing the desired channels are then provided on the single cable, eliminating the need for any additional switching and multiple cable connections.

The analog solution involving preselection, combination, and redistribution remains limited in the number of channels that can be provided due to the inherent shortcomings of performing the processing in the analog domain. Narrow band filters used to select individual physical channels while rejecting others are impractical at frequencies above the range of one gigahertz (GHz). Available filters having a practical bandwidth require additional channel separation in order to prevent undesired interferences in the output signal. Additionally as the desire to deliver more requested channels to the home increases, the subsequent increase in analog circuit complexity results in an expensive and inefficient design with potential problems due to analog crosstalk. Therefore there is a desire to have a solution providing receiving and re-synthesizing of channels for distribution in a more optimal manner.

SUMMARY OF THE INVENTION

The present invention relates to an apparatus and method for performing frequency translation. The apparatus includes a receiver for receiving and digitizing a plurality of first signals, each signal containing channels and for simultaneously recovering a set of selected channels from the plurality of first signals. The apparatus also includes a transmitter for combining the set of selected channels to produce a second signal.

The method of the present invention includes receiving a first signal containing a plurality of different channels, selecting a set of selected channels from the plurality of different channels, combining the set of selected channels to form a second signal and transmitting the second signal.

Figure 1:
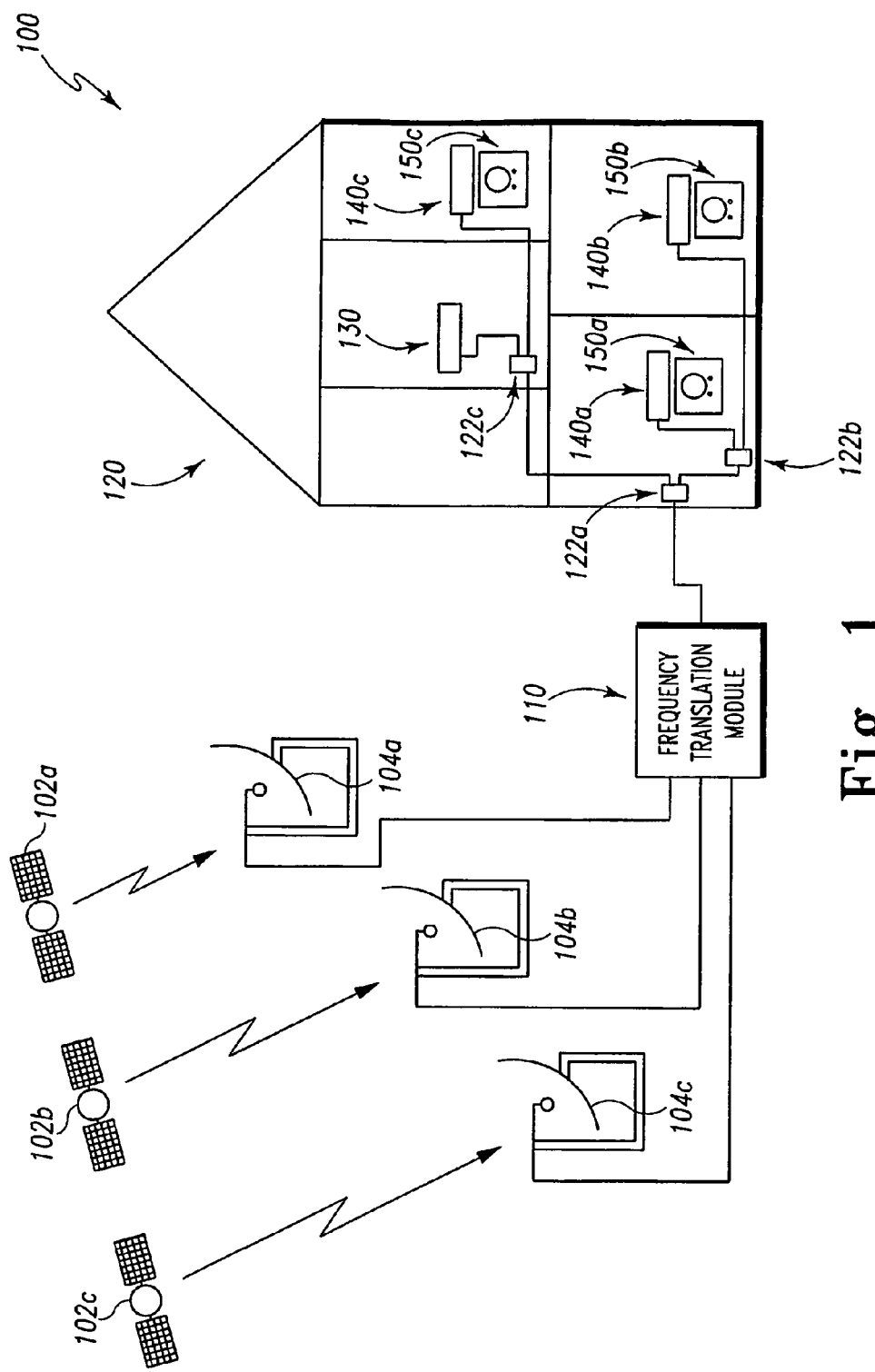
FIG. 1 is a block diagram of an exemplary system using the present invention.

The characteristics and advantages of the present invention may become more apparent from the following description, given by way of example.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

It is noted that familiarity with television broadcasting and receivers is assumed and is not described in detail herein. For example, other than the inventive concept, familiarity with current and proposed recommendations for TV standards such as National Television Systems Committee (NTSC), Phase Alternation Lines (PAL), Sequential Couleur Avec Memoire (SECAM), Advanced Television Systems Committee (ATSC), and Direct Broadcast Satellite (DBS) is assumed. Likewise, other than the inventive concept, transmission concepts such as satellite transponders, down-link signals, eight-level vestigial sideband (8-VSB), Quadrature Amplitude Modulation (QAM), and receiver components such as a radio-frequency (RF) front-end, or receiver section, such as a low noise block, tuners, and demodulators is assumed. Similarly, formatting and encoding methods (such as Moving Picture Expert Group (MPEG)-2 Systems Standard (ISO/IEC 13818-1)) for generating transport bit streams are well-known and not described herein. In addition, the inventive concept may be implemented using conventional programming techniques which, as such, will not be described herein.

The following describes a circuit used for processing satellite signals. Other systems utilized to receive other types of signals where the signal input may be supplied by some other means may include very similar structures. Those of ordinary skill in the art will appreciate that the embodiment of the circuits described herein is merely one potential embodiment. As such, in alternate embodiments, the components of the circuit may be rearranged or omitted, or additional components may be added. For example, with minor modifications, the circuits described may be configured to for use in non-satellite video and audio services such as those delivered from a cable network. Further, the invention described could be used in conjunction with a home networking system. The device may receive inputs from a satellite or cable network, process them, and provide them as an output to the home network system. The output may in the form of a wired or wireless transmission.

Turning now to the drawings and referring initially to FIG. 1, an overall block diagram 100 of a system using the present invention is shown. FIG. 1 represents a typical satellite system installation at a customer home. A similar installation may also exist at an apartment complex or hotel where the system may be augmented with additional equipment often incorporated in multi-dwelling unit applications. Satellite transponders located on satellites 102*a-c* transmit satellite signals to satellite dishes 104*a-c*. Each satellite dish contains a reflector, a feed horn and a low noise block converter (LNB).

Each of the satellite signals may represent one or more individual physical channels. Each of the physical channels may in turn represent one or more preferably digital data streams of information combined together, encoded, and modulated using various analog and/or digital modulation techniques. The physical channels are often grouped to cover a limited frequency range such as 500 to 1000 MHz of bandwidth. The satellite signals are often located in the microwave frequency range, for instance 11-13 Gigahertz (GHz). The LNBs in the satellite dishes 104*a-c* will amplify and convert the satellite signal in the 11-13 GHz range to an L-band signal in the 1-2 GHz frequency range. Although three satellite dishes are shown, the orbital locations of the satellites 102*a-c* may permit using one satellite dish containing one reflector and three feed horns and LNBs. Also, systems may utilize more or fewer than the three satellites signals illustrated here. The systems may additionally use techniques such as polarization diversity to increase the number of satellite signals delivered from each satellite.

Each of the three L-band signals from the satellite dishes 104*a-c* are provided through separate coaxial cables to a frequency translation module (FTM) 110. The three L-band signals in their entirety cannot be supplied through a single coaxial cable for delivery into the customer home, because the L-band signals occupy too much frequency bandwidth. As previously described, each L-band signal may occupy 1 GHz of bandwidth, and a typical customer premises cable installation may only support less than 2 GHz of total signal bandwidth. The FTM 110 extracts certain ranges of frequencies containing selected physical channels as portions of the three L-band signals provided. The FTM 110 also frequency translates the extracted ranges as needed and re-combines them to form a new single selected L-band signal. The process used by the FTM 110 may be described as a preselection of certain physical channels. However, the process used by the FTM 110 is different from a direct tuning of those certain physical channels since other energy besides the selected channel may be present, and the channels are then recombined to form a new signal for further distribution. Note that the FTM 110 may reside physically outside the customer home as shown, or may reside very near to the entry point into the customer home.

Once the FTM 110 has preselected the physical channels for use, the selected signal is provided over a single coaxial cable to the customer's premises 120. The selected signal may pass through a set of signal splitters 122*a-c*, as needed, to supply each of the locations for the premises installation. The splitters 122*a-c* may contain passive circuits such as transformers and resistors or may also contain amplifiers in order to increase the signal level at the installation location.

At each installation location in the premises 120, the selected signal is provided to a standalone terminal 130 or to a combination settop box 140*a-c* and display device 150*a-c*. The terminal 130 and settop box 140*a-c* operate in a similar manner. Each of them receive the selected signal, tune to the desired physical channel within the selected signal, demodulate the physical channel to produce a transport stream, and extract the desired bit stream(s) from the transport stream. The terminal 130 may be used for local storage of various bit streams or for distribution of these bitstreams over a different network such as a wireless network or an Ethernet connection. The settop box 140*a-c* converts the desired bitstream(s) into video and audio signals for display on the display device 150*a-c*.

The terminal 130 and settop boxes 140*a-c* may provide one or more control signals back onto the cable to the FTM 110. The control signal is generated based on inputs provided, for instance by a customer. The control signal sent to FTM 110 contains information necessary to perform the preselection of frequency ranges and physical channels from each of the L-band signals. The communication protocol to the FTM 110 may be done in a manner suitable for delivery as is known in the art, such as frequency shift keying FSK protocol. The control signal may alternately be supplied through a wireless link. Electrical power may also be passed through the coaxial cable to the FTM 110 and further on to the satellite dishes 104*a-c*.

As described earlier, a conventional FTM contains analog signal processing used for the filtering, mixing, and recombining of the L-band signals. Analog signal processing contains limitations when operating at high frequencies in the 1 GHz range, and the complexity of the analog signal processor increases significantly with an increase of the number of selected physical channels. The utilization of digital signal processing within the FTM structure permits greater flexibility and removes some of the limitations of analog signal processing.

Figure 2:
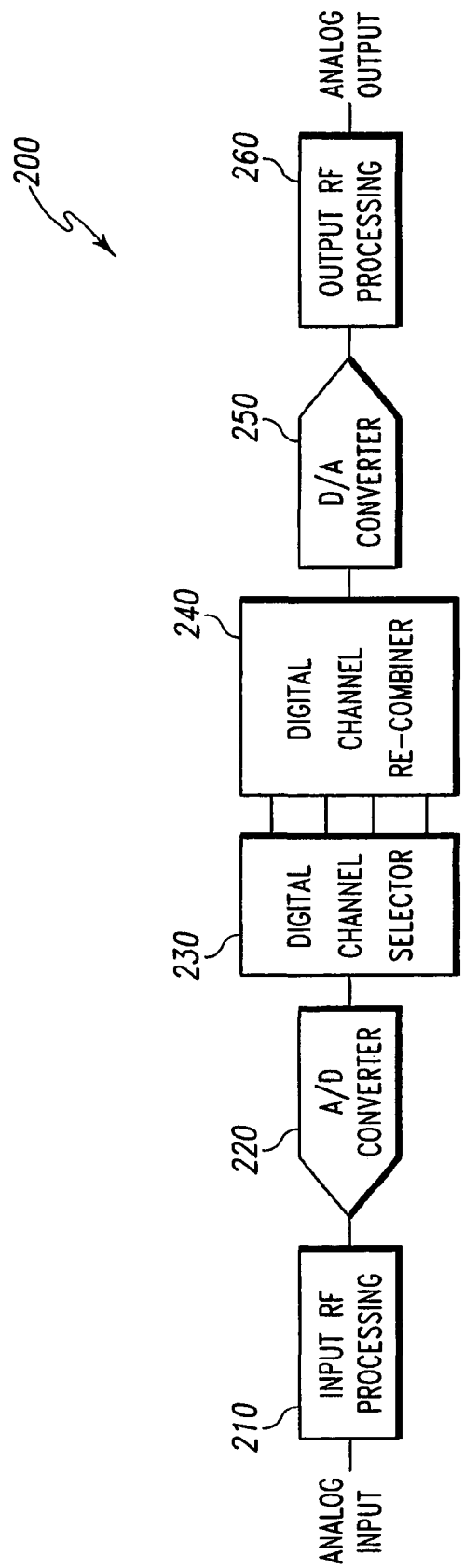
FIG. 2 is a block diagram of an embodiment of the present invention.

Turning now to FIG. 2 a block diagram 200 of an embodiment of the present invention is shown. The diagram shows an implementation of the FTM 110 that includes digital signal processing in order to increase the performance and available bandwidth for selected channels. In order to facilitate a further understanding of the invention, an FTM 110 will be described here using only a single L-band signal as an input. The single L-band signal, as an analog input, is processed through an RF processing block 210. The RF processing block 210 may contain circuitry for filtering undesired energy outside the signal frequency range, may correct for any frequency response errors introduced, and may amplify the signal to a level necessary for input to the analog to digital (A/D) converter 220. The input RF processing block 210 may also contain any mixing circuits necessary to position the L-band signal in the correct frequency range for operation of the A/D converter 220.

The A/D converter 220 digitizes the processed L-band signal into a series of samples, each sample containing a group of bits. In an exemplary embodiment, the processed satellite signal Is located between the frequencies of 975 and 1425 MHz. The A/D converter 220 samples the processed L-band signal at a rate of 933 megasamples per second (MSPS) generating a digital signal containing a series of samples, each sample represented by 8 bits. The A/D converter 220 may also generate a translated frequency image of the L-band signal essentially translating the signal from an initial frequency range in the analog domain to a different frequency range based on sampling principles. A clock signal, not shown, is supplied to the A/D converter for performing the sampling. The clock signal may be generated by a crystal or as part of a voltage controlled oscillator. The clock signal may also directly, or through additional multipliers and dividers, supply signals to other blocks within the FTM 110.

The digital channel selector 230 receives the sampled signal and proceeds to select and down-convert each of the individual physical channels that have been selected. After processing, each of the selected individual channels are located within the same frequency range at or near to baseband, but are contained as individual signals on separate signal lines. The number of bits representing each selected individual channel may be different from the original sampled signal based on the processing method employed. The use of digital signal processing and processing of the signal in parallel permits narrower filtering constraints and more efficient channel selection within the FTM 110.

Each of the individual selected channels is provided to the digital channel re-combiner 240. The digital channel re-combiner 240 frequency translates the individual selected channels each to a different and separate frequency range and combines these signals together to form a single selected digital signal. The selected digital signal is supplied to a digital to analog, (D/A) converter 250. The D/A converter 250 converts the selected digital signal to a selected analog signal.

In a preferred embodiment, the selected digital signal provided to the D/A converter 250 is a series of 10 bit samples at a rate of 950 MSPS. The D/A converter 250 outputs a selected analog signal within a frequency range of DC to 475 MHz.

The selected analog signal is passed to the RF processing block 260. The RF processing block 260 provides any analog signal processing necessary to properly send the selected analog signal on the coaxial cable to the customer home. The RF processing block 260 may contain circuitry for filtering undesired signal energy outside the signal frequency range, such as the images produced by the sampling process in D/A converter 250. The RF processing block 260 may also correct for any other frequency response errors introduced, and may amplify the signal as necessary to provide the signal onto a coaxial cable. The RF processing block 260 may also contain a mixing circuit necessary to position the selected analog signal in the correct L-band frequency range, for instance 975-1425 MHz.

Some additional circuitry may also be included such as circuitry for controlling the blocks, receiving and processing user inputs, and additional signal processing, although this circuitry is not shown here.

Figure 3:
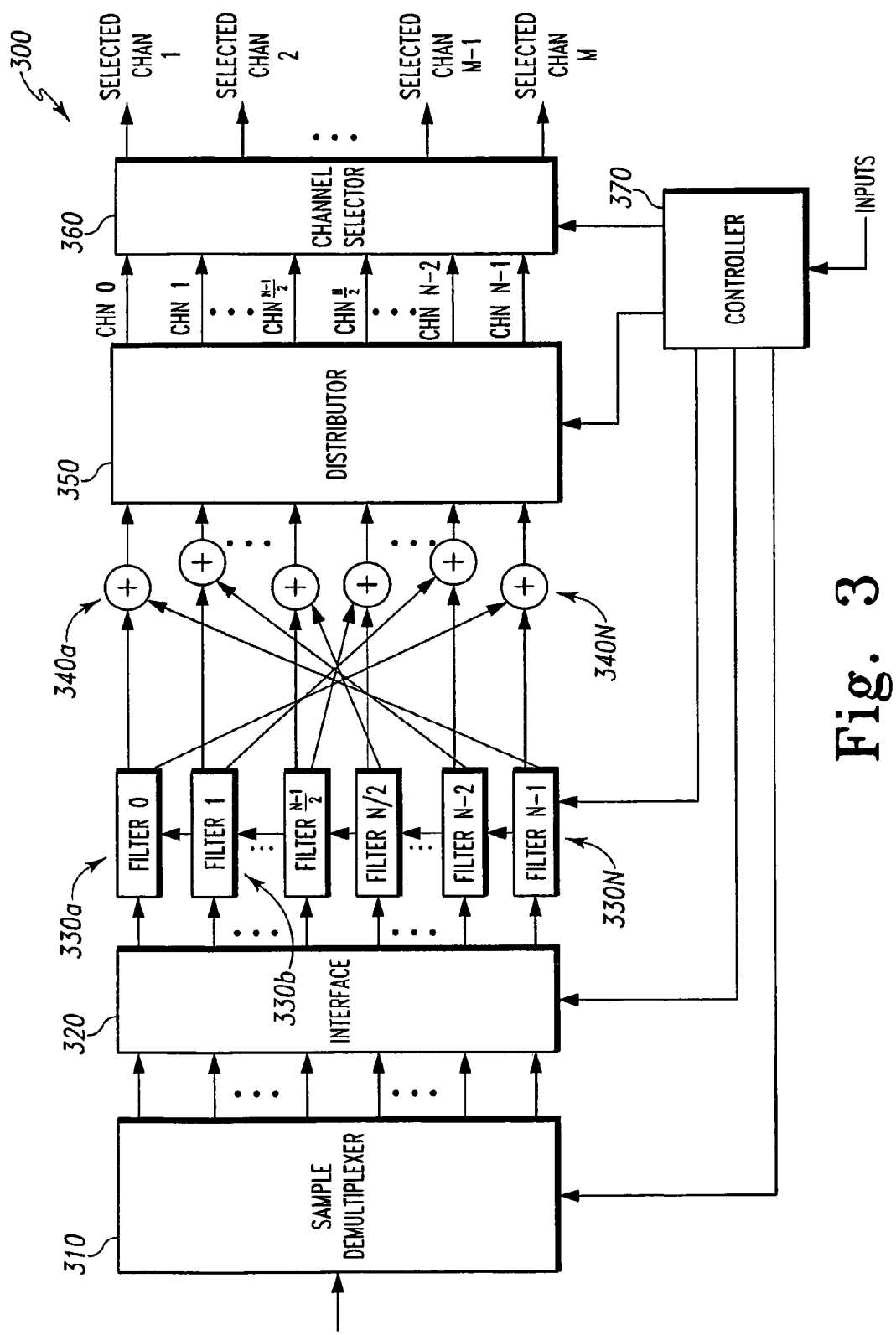
FIG. 3 is a block diagram of another embodiment of the present invention.

Turning now to FIG. 3, an illustrative block diagram of a circuit 300 of an embodiment of a portion of the present invention is shown. Circuit 300 represents circuitry contained with the digital channel converter block 230. A sampled signal, converted from an L-band signal by A/D converter 220, is provided to the sample demultiplexer 310. Sample demultiplexer 310 resamples at a demultiplexer sampling rate, $F_F$, (or post-decimation sampling rate) to provide a number of decimated sample streams in parallel.

Each of the decimated sample streams represents a sampled and time shifted version of the original signal with each of the folded spectra, from the decimation, aliased into the same decimated frequency space. The number of decimated sample streams, N, may be integrally related to the number of virtual channels in the original signal. In a preferred embodiment, the number of physical channels is sixteen. Further, the sample demulitplexer 310 sampling rate is preferably two times the data rate of one of the physical channels, or $F_F=2F_S$ where $F_s$ is the data rate of the physical channel. Each of the decimated sample streams passes through a sampling interface block 320. The sampling interface block 320 provides any sampling domain adjustments necessary in moving the signal from the A/D converter 220 and sample demulitplexer 310 to the filter bank 330*a*-N, connected to the sampling interface block 320. The filter bank 330*a*-N may provide a number of process steps including filtering the physical channels that are distributed within the decimated sample streams prior to the physical channels being separated. The filtering provides rejection of any energy not within a physical channel while generating a reconstructive set of base signals for selecting out the physical channels in further downstream processing. The filter bank 330*a*-N may also provide a time realignment of each of the decimated sample streams. In a preferred embodiment, the filter bank 330*a*-N consists of a bank of bifurcated filters that collectively generate a filtered signal vector. Since all the bifurcated filters have a similar structure, only one bifurcated filter is described in detail herein.

A bifurcated filter may typically consist of two parallel branches of coefficient multiply and delay operations with the operations in each of the branches separately summed together. Each branch is designated as either an even output signal or an odd output signal. The number of multiply and delay operations in each branch may vary based on design criteria. For instance, sixteen weighted multiply and a number of coefficient multipliers may be used in each bifurcated filter. The delay element is controlled by a decimated sample clock signal, not shown, at a frequency $F_f$. The summing node separately adds together the values from each of the odd weighted multipliers and even weighted multipliers to form the odd and even output signal. The orientation of the filter branches and operations within the branches allows special properties to exist. These properties include amplitude inversion of the signal or time reversing the signal within the branch. As noted, other filter structures may be used, as known by those skilled in the art, in conjunction with the various techniques of simultaneous channel reception techniques.

The output signal, a filter signal vector containing 2N signal streams, from the filter bank 330a-N connects to a bank of summing nodes 340a-N. Referring to the preferred embodiment, the even and odd outputs from each of the different bifurcated filters may be combined in a cross-coupling pattern. The even output of filter 0 is summed with the odd output of filter N−1, even output of filter 1 with the odd output of filter N−2, and so on as shown. The summing nodes 340a-N generate a set of filtered sample streams.

The filtered sample streams at the output of summing nodes 340a-N connect to a distributor block 350. The main purpose of the distributor, block 350 is to process the filtered sample streams generated by the filter block 330a-N and summing nodes 340a-N to reconstruct the set of physical channels, originally provided in the L-band signal, from the decimated and filtered sample streams. The processing may include recombining the streams in a manner using mathematical operations. In a preferred embodiment the distributor block 350 uses a type IV Discrete Cosine Transform (DCT) for processing the filtered sample streams. The bifurcated filter structure described previously further permits a small DCT structure in implementation by making use of the inversion and time reversal properties of the filter. The bifurcated filter structure may also permit use of a DCT employing a sparse matrix decomposition structure.

The combination of the filter bank 330a-N, summing node 340a-N, and distributor 350 results in generating a set of output streams, each representing the separated data content from a physical channel. The set of individual physical channels from the distributor 350 are generated from the set of decimated sample streams where each stream contains content from each of the physical channels in a sample aliased condition. It should be noted that other methods may be employed for accomplishing recovery of separate physical channels simultaneously from a single signal.

The output of distributor block 350 represents N individual physical channels positioned at or near to baseband frequency. Each physical channel, in digital signal form, may be located on a separate signal line at the output of distributor block 350. Each of the separate signal lines connect to a channel selector block 360. The channel selector block 360 may select a set of physical channels from the original N input channels provided. Any number of channels up to the full number N may be selected. For instance, four channels may be selected. The number of channels permitted for selection in channel selector block 360 is a design choice, and the full number of permitted channels for selection does not have to be selected at any one time. Additionally, any further physical channel separation may be performed, such as removing any aliasing components present due to the complex form of the signal as a result of the previously described processing.

The channel selector block 360 receives inputs from a controller 370 regarding which, if any, of the originally received physical channels is currently requested by the customer. The controller 370 may connect to the sample demultiplexer 310, interface 320, filter bank 330a-N, and distributor 350 in addition to connecting to channel selector 360. The controller 370 may also provide an interface for user inputs or a communications input in order to receive and convey the user requested channel information from multiple locations. As described previously, the user inputs may be supplied through the signal cable or through some other communications means. Also, as described previously, a home or customer premises may supply more than one customer input. In addition, controller 370 may provide additional functions for operation of the demultiplexer 310, interface 320, filter bank 330a-N, and assembler 350, such as clock functions, as necessary. The controller 370 may also be embodied as a portion of a larger controller function responsible for controlling and managing, for instance, the entire FTM device.

Figure 4:
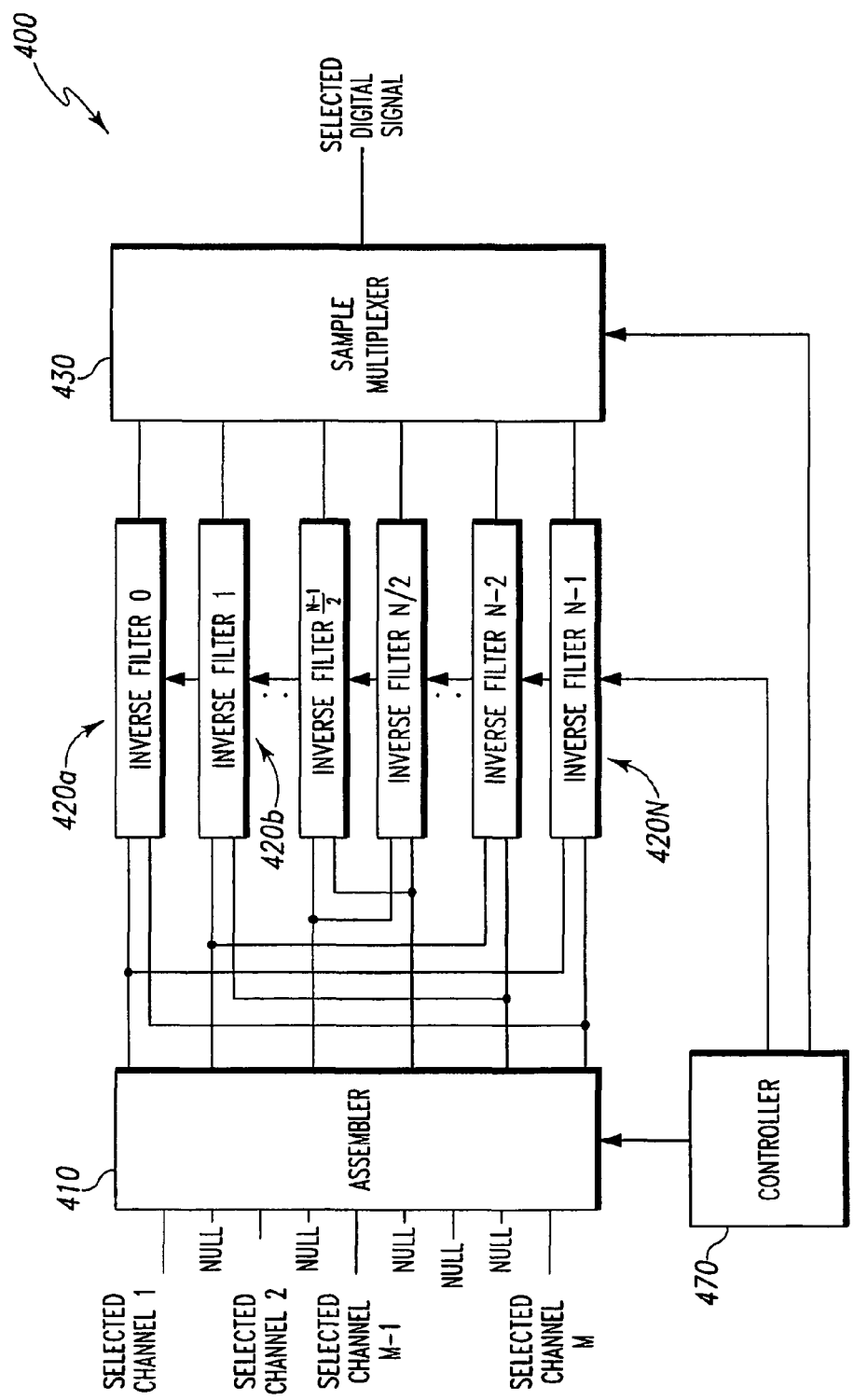
FIG. 4 is a block diagram of yet another embodiment of the present invention.

Turning now to FIG. 4, a block diagram 400 of a further embodiment of the present invention is shown. FIG. 4 illustrates an implementation of the digital channel re-combiner 240. The M outputs, representing a set of selected physical channels, of channel selector 360 are provided to the assembler 410. As described previously, the M outputs of the channel selector 360 may be equal to or less than the N physical channels present in the original L-band signal. In a preferred embodiment, the assembler 410 may receive up to N inputs. If the number of signals provided from channel selector 360 is less than N, the remaining inputs of channel assembler 410 are placed in a condition of "null" or no input. Additionally, the assembler 410 may also provide the ability to re-order the M input signals. For instance, if the M signals provided to the assembler 410 are physical channels in positions 1, 2, 3, and 4 from selection of the original N channels, the assembler 410 may re-position the M signals by addressing them as inputs 1, 5, 9, and N−1. In this manner, further processing, including internal or external filtering may be simplified. Also, the re-positioning permits re-spacing of the M signals.

The assembler 410 provides processing for converting the selected channels into a set of signals forming a base set of parallel data streams that can then be filtered prior to remultiplexing and converting to an analog signal. The channel re-combiner 410 provides N outputs as a set of converted sample streams to inverse filter bank 420a-N. The inverse filter bank 420a-N provides filtering and/or time delay operations necessary to permit signal remultiplexing. The output of the inverse filter bank 420a-N provides a set of inverse filtered sample streams.

The inverse filtered sample streams at the output of the inverse filter bank 420a-N are provided to the sample multiplexer 430. The sample multiplexer 430 re-combines the samples, in a time multiplexing fashion, into a single sample stream. The sampling rate of the new single sample stream is preferably $2NF_s$ ($F_s$ is the data rate of one channel). Clock signals representing both the input parallel sample stream rate and the new sampling rate at the output of the sample multiplexer 430 are also provided.

In a preferred embodiment, the assembler 410 is realized as an inverse type IV DCT, and the filter bank 420a-N is realized as an effective inverse bifurcated filter-bank with respect to filter bank 330a-N as previously described. In this and other possible approaches, advantages exist due to the sparse matrix factorization stages containing a defined sparse inverse as well as the complementary form of the filtering stages. For example, the Type IV DCT is its own inverse i.e., $(DCT\ IV)^2=I$ (identity matrix), and the bifurcated filters work with the transform elements to shape the bands of independent physical channels. Also, the inverse filter bank 420a-N, shown as a bifurcated filter structure has a signal splitting at its input for providing a cross coupling of signals to the even and odd branches of the individual filters. After each branch in the individual filters has completed processing, the even and odd branches of each individual filter are summed together to form the individual output signal.

Alternatively, since the type IV DCT function in both the distributor 350 and assembler 410 may be the same, only one block for both operations may be used. For example, a single block may, in conjunction with a signal multiplexer (not shown), provide either an output signal representing the set of individual physical channels or the base set of parallel data streams in alternating operations.

A controller 470 may connect to the assembler 410, filter bank 420a-N, and sample multiplexer 430. The controller 470 may control the final selection process and ordering of selected physical channels in assembler 410. The controller 470 may follow a pre-programmed allocation and ordering algorithm, or may process user inputs to determine the allocation and ordering. The controller 470 may also provide an interface for user inputs or a communications input in order to receive and convey the user requested channel information from multiple locations. As described earlier, a home or customer premises may supply more than one customer input. In addition, controller 470 may provide additional functions for operation of the assembler 410, filter bank 420a-N, and multiplexer 430 such as clock functions, as necessary. The controller 470 may also be embodied as a portion of a larger controller function responsible for controlling and managing, for instance, the entire FTM device.

Additionally, if the M signals at the input to the assembler 410 are less than the N original channels, the channel re-combiner may also change the overall sampling rate. The assembler 410 may be reconfigured to process the M signals in an M point transform, producing M parallel data streams. The filter bank may subsequently contain only M branches and the sample multiplexer process only M inputs. The clocks, supplied to the D/A converter as well as other blocks with diagram 400 may also be a scaled version of the clock used for digital channel selector 230. For instance, if M is one half the number N, then the clock signal for the digital channel re-combiner 240 may be one half the frequency of the clock signal for the digital channel selector 230. Note that the clock signal supplied to the other blocks working on parallel data streams may remain unaffected.

Further, the choice of value of M may be chosen to permit a maximum of allowable channels at any time. However, in actual operation, a number less than M channels may actually be in use.

Figure 5:
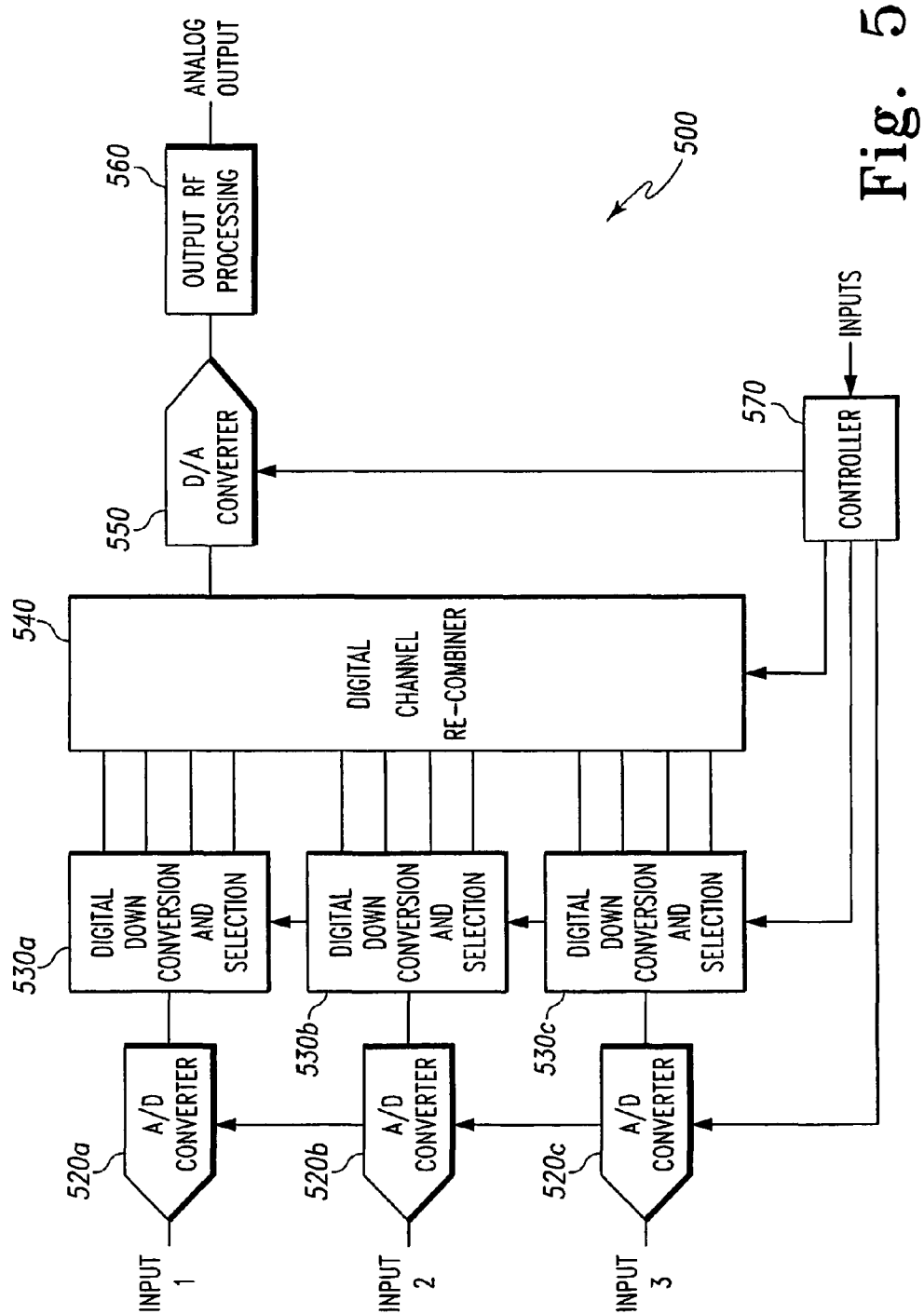
FIG. 5 is a block diagram of a further embodiment of the present invention.

Turning now to FIG. 5, a block diagram of another embodiment of the present invention is shown. FIG. 5 illustrates a three L-band signal input FTM utilizing the inventive concept described herein. Each L-band input signal is processed through RF input processing, not shown. Each L-band signal is further processed in A/D converter 520a-c, and digital channel selectors 530a-c as described previously. Also, D/A converter 550 and output RF processing block 560 operate as described previously.

Each digital channel selector 530a-c is capable of producing M outputs representing M physical channels where M is less than or equal to the N original physical channels from an L-band signal. Each L-band signal may provide a different number of physical channels.

The digital channel re-combiner 540 may process up to N channels in its assembler block as described above. The assembler in the digital channel re-combiner 540 also includes switching and selection circuits to manage which of the M inputs from each of the digital channel selectors 530a-c are processed in the digital channel re-combiner 540. The management and switching function is controlled by the controller 570.

The controller 570 provides functions to ensure that a selected combination of the M outputs from the selectors 530a-c does not exceed the N inputs for selected channels possible for processing in digital channel re-combiner 540. The controller 570 receives inputs from the one or more users and processes the inputs to determine the correct combination of inputs. In a preferred embodiment, each of the digital channel selectors 530a-c may provide up to six signals to the digital channel re-combiner. The digital channel re-combiner 540 may accept only sixteen signals. The controller 570 may determine, for instance based on inputs from users, that only five inputs will be used from digital channel selectors 530a and 530b, and all six will be used from digital channel selector 530c. Additional user inputs may then require a change to this apportionment. The controller 570 may also provide control or other necessary signals such as clock signals to A/D converters 520a-c, digital channel selectors 530a-c and D/A converter 550.

The digital channel re-combiner 540 may also contain signal processing such as digital signal level adjustment applied to each of the selected channels. Level adjustment may allow all selected channels to be delivered at approximately the same signal level improving the operation of home equipment such as settop boxes.

Block diagram 500 forms a multi-input, single output channel selection, translation, and distribution device. The device produces an output of up to N channels in a single signal for delivery over a single coaxial cable, from an input containing up to three times N possible input channels presented in three separate signals. The use of three inputs is illustrative, and a greater or fewer number of inputs containing a greater or fewer number of possible input channels may be used.

Figure 6:
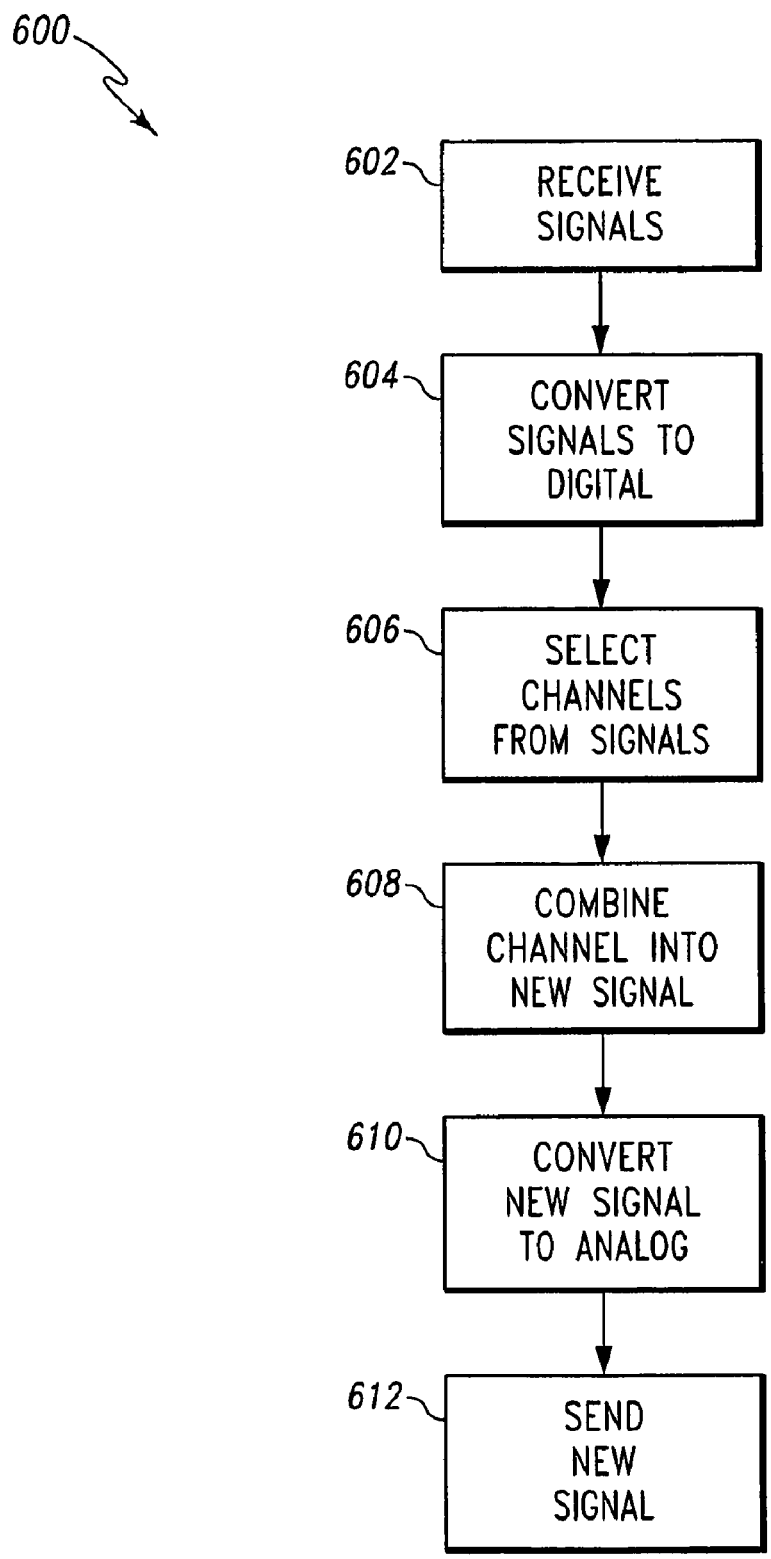
FIG. 6 is a flow chart illustrating a method of the present invention.

Turning now to FIG. 6, a flow chart 600 showing an embodiment of the method of the present invention is shown. At step 602, one or more incoming satellite signals are received by a device, such as the FTM device described previously in block diagram 500. Next, at 604, the incoming satellite signals are converted to digital signals. The conversion is preferably performed by A/D converters 530a-c, and may further include a processing means for separating the individual physical channels after the conversion such as described in digital channel selectors 530a-c.

Next, at step 606, the desired physical channels are selected to form a group of selected physical digital channels in parallel. The selected physical channels are selected in the digital channel selectors 530a-c based on requests by the customer's home equipment processes and managed by, for instance, controller 570. The controller 570 may be responsible for receiving and managing multiple requests and providing the proper information to the digital channel selectors 530a-c as well as the digital channel re-combiner 540.

The group of selected digital channels, at step 608, are re-combined in a frequency diverse manner to form a signal occupying a range of frequencies and containing the selected digital channels at separate frequencies. The recombination may include a means for processing the group of selected digital channels such as described for digital channel re-combiner 540. At step 610, the recombined frequency diverse signals are converted back into an analog signal containing the selected channels at separate frequencies. The conversion may be done using a D/A converter 550 and may also include any additional processing as described for output RF processing block 560. Finally, at step 612, the analog signal is sent or transmitted to additional devices, for instance devices found in customer premises connected by a single coaxial cable.

While the invention may be susceptible to various modifications and alternative forms, specific embodiments have been shown by way of example in the drawings and have been described in detail herein. The foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of separate functional elements, these functional elements may be embodied on one or more integrated circuits (ICs). Similarly, although shown as separate elements, any or all of the elements of may be implemented in hardware, software, or a combination of both. It is therefore to be understood that numerous modifications may be made to the illustrative embodiments and that other arrangements may be devised without departing from the scope of the present invention as defined by the appended claims.

What is claimed is:

1. An apparatus comprising:
   a receiver for receiving and digitizing a plurality of first signals, each signal containing one or more different channels and for simultaneously recovering a plurality of selected channels from said plurality of first signals, the receiver further including:
   a sampler for sampling said plurality of first signals and providing a plurality of decimated sample streams; and
   a distributor operatively connected to said sampler for processing said plurality of decimated sample streams to provide output signals representative of said one or more different physical channels, the distributor including a transform element that performs matrix-based processing on said plurality of decimated sample steams using a sparse matrix factorization of a type IV discrete cosine transform; and
   a transmitter for combining said plurality of selected channels and producing a second signal.

2. The apparatus of claim 1, wherein said sampler further comprises:
   a demultiplexer for demultiplexing the signal into said plurality of decimated sample streams; and
   a plurality of filters operatively connected to said demultiplexer for processing said plurality of decimated sample streams.

3. The apparatus of claim 2, wherein said plurality of filters includes a plurality of bifurcated filters.

4. The apparatus of claim 1, wherein said receiver further comprises a selector operatively connected to said distributor for selecting said plurality of selected channels.

5. The apparatus of claim 1, wherein said transmitter further comprises:
   an assembler that assembles said plurality of selected channels to provide a set of parallel data streams representing the combination of said plurality of channels; and
   a converter for converting said parallel data streams into said second signal.

6. The apparatus of claim 5, wherein said assembler includes a transform element.

7. The apparatus of claim 6, wherein said transform element performs matrix-based processing on said plurality of selected channels using a sparse matrix factorization of type IV discrete cosine transform.

8. The apparatus of claim 5, wherein said converter further comprises:

a plurality of filters for processing said plurality of parallel data streams; and
a multiplexer connected to said plurality of filters for multiplexing said plurality of parallel data streams into a single sample stream.

9. The apparatus of claim 8, wherein said plurality of filters includes a plurality of bifurcated filters.

10. A method for providing frequency translation comprising:
    receiving a first signal having a plurality of different frequency channels;
    selecting a set of frequency channels from said plurality of different frequency channels, the step of selecting further including;
    demultiplexing the signal into a number of decimated sample streams;
    filtering said number of decimated sample streams with a plurality of filters; and
    performing a transform on said number of decimated sample streams to provide transform output signals;
    combining said set of frequency channels to form a second signal; and
    transmitting said second signal,
    wherein said plurality of filters include a plurality of bifurcated filters for matching said transform and said transform is a type IV discrete cosine transform.

11. The method of claim 10, wherein the step of selecting further comprises re-ordering said set of frequency channels.

12. The method of claim 10, wherein said step of combining further comprises:
    performing transform-based processing on said set of different frequency channels to provide a plurality of parallel data streams; and
    processing said plurality of parallel data streams to provide said second signal.

13. An apparatus for frequency translation comprising:
    means for receiving a first signal having a plurality of different frequency channels;
    means for sampling said plurality of first signals and providing a plurality of decimated sample streams;
    means for translating said first signal into a set of signals representing said plurality of different frequency channels, the means for translating including a transform element that performs matrix-based processing on said plurality of decimated sample steams using a sparse matrix factorization of a type IV discrete cosine transform;
    means for selecting a set of channels from said set of signals
    means for combining said set of channels to form a second signal; and
    means for transmitting said second signal.

14. An apparatus for frequency translation comprising:
    means for receiving a first signal having a plurality of different frequency channels;
    means for sampling said plurality of first signals and providing a plurality of decimated sample streams;
    means for translating said first signal into a set of signals representing said plurality of different frequency channels, the means for translating further including:
    means for demultiplexing the signal into the number of decimated sample streams; and
    means for filtering said number of decimated sample streams with a plurality of filters, said means for filtering including a plurality of bifurcated filters;
    means for selecting a set of channels from said set of signals;

means for combining said set of channels to form a second signal; and means for transmitting said second signal.

15. An apparatus for frequency translation comprising:
means for receiving a first signal having a plurality of different frequency channels;
means for translating said first signal into a set of signals representing said plurality of different frequency channels;
means for selecting a set of channels from said set of signals;
means for combining said set of selected channels to form a second signal, said means for combining further including:
means for assembling said plurality of selected channels to provide a set of parallel data streams representing the combination of said set of selected channels using a transform element that performs matrix-based processing on said set of selected channels using a sparse matrix factorization of type IV discrete cosine transform; and
means for converting said parallel data streams into said second signal; and
means for transmitting said second signal.

16. An apparatus for frequency translation comprising:
means for receiving a first signal having a plurality of different frequency channels;
means for translating said first signal into a set of signals representing said plurality of different frequency channels;
means for selecting a set of channels from said set of signals;
means for combining said set of selected channels to form a second signal, said means for combining further including:
means for assembling said set of selected channels to provide a set of parallel data streams representing the combination of said plurality of channels; and
means for converting said parallel data streams into said second signal, said means for converting further including:
means for filtering said plurality of parallel data streams; and
means for multiplexing said plurality of parallel data streams into said second signal; and
means for transmitting said second signal.

17. A method for providing frequency translation comprising:
receiving a first signal having a plurality of different frequency channels;
sampling said plurality of first signals and providing a plurality of decimated sample streams;
selecting a set of frequency channels from said plurality of different frequency channels, the step of selecting further including:
demultiplexing the signal into the number of decimated sample streams; and
filtering said number of decimated sample streams with a plurality of filters, said means for filtering including a plurality of bifurcated filters;
combining said set of selected frequency channels to form a second signal; and
transmitting said second signal.

18. A method for providing frequency translation comprising:
receiving a first signal having a plurality of different frequency channels;
selecting a set of frequency channels from said plurality of different frequency channels;
combining said set of selected frequency channels to form a second signal, said step of combining further including:
assembling said plurality of selected channels to provide a set of parallel data streams representing the combination of said plurality of channels using a transform element that performs matrix-based processing on said set of selected frequency channels using a sparse matrix factorization of type IV discrete cosine transform; and
converting said parallel data streams into said second signal; and
transmitting said second signal.

19. A method for providing frequency translation comprising:
receiving a first signal having a plurality of different frequency channels;
selecting a set of frequency channels from said plurality of different frequency channels;
combining said set of frequency channels to form a second signal, said step of combining further including:
assembling said plurality of selected channels to provide a set of parallel data streams representing the combination of said plurality of channels; and
converting said parallel data streams into said second signal, said means for converting further including:
filtering said plurality of parallel data streams; and
multiplexing said plurality of parallel data streams into said second signal; and
transmitting said second signal.

20. An apparatus comprising:
a receiver for receiving and digitizing a plurality of first signals, each signal containing one or more different channels and for simultaneously recovering a plurality of selected channels from said plurality of first signals, the receiver further including:
a sampler for sampling said plurality of first signals and providing a plurality of decimated sample streams, said sampler further including:
a demultiplexer for demultiplexing the signal into said plurality of decimated sample streams; and
a plurality of filters operatively connected to said demultiplexer for processing said plurality of decimated sample streams wherein said plurality of filters includes a plurality of bifurcated filters; and
a distributor operatively connected to said sampler for processing said plurality of decimated sample streams to provide output signals representative of said one or more different physical channels; and
a transmitter for combining said plurality of selected channels and producing a second signal.

21. An apparatus comprising:
a receiver for receiving and digitizing a plurality of first signals, each signal containing one or more different channels and for simultaneously recovering a plurality of selected channels from said plurality of first signals; and
a transmitter for combining said plurality of selected channels and producing a second signal, said transmitter further including:
an assembler that assembles said plurality of selected channels to provide a set of parallel data streams representing the combination of said plurality of channels, said assembler including a transform element that performs matrix-based processing on said plurality of selected channels using a sparse matrix factorization of type IV discrete cosine transform; and a converter for converting said parallel data streams into said second signal.

22. An apparatus comprising:
a receiver for receiving and digitizing a plurality of first signals, each signal containing one or more different channels and for simultaneously recovering a plurality of selected channels from said plurality of first signals; and a transmitter for combining said plurality of selected channels and producing a second signal, said transmitter further including:

an assembler that assembles said plurality of selected channels to provide a set of parallel data streams representing the combination of said plurality of channels;

a plurality of filters for processing said plurality of parallel data streams;

a multiplexer connected to said plurality of filters for multiplexing said plurality of parallel data streams into a single sample stream; and a converter for converting said single sample stream into said second signal.

\* \* \* \* \*